US007297860B2

(12) United States Patent
Decuir

(10) Patent No.: US 7,297,860 B2
(45) Date of Patent: Nov. 20, 2007

(54) SYSTEM AND METHOD FOR DETERMINING GENRE OF AUDIO

(75) Inventor: John David Decuir, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 286 days.

(21) Appl. No.: 10/987,966

(22) Filed: Nov. 12, 2004

(65) Prior Publication Data
US 2006/0101985 A1 May 18, 2006

(51) Int. Cl.
G10H 1/00 (2006.01)
G10H 1/18 (2006.01)
G10H 7/00 (2006.01)
G06Q 30/00 (2006.01)
H04K 1/00 (2006.01)

(52) U.S. Cl. ............ 84/615; 84/464 R; 84/477 R; 84/600; 84/609; 84/634; 84/645; 700/245; 705/1; 705/26; 705/50; 705/51

(58) Field of Classification Search .......... 84/615, 84/464 R, 600, 477 R, 645, 609, 634; 700/245
See application file for complete search history.

(56) References Cited

U.S. PATENT DOCUMENTS

| | | | | |
|---|---|---|---|---|
| 5,270,480 A | * | 12/1993 | Hikawa | 84/645 |
| 5,508,470 A | * | 4/1996 | Tajima et al. | 84/609 |
| 5,636,994 A | * | 6/1997 | Tong | 434/308 |
| 5,870,842 A | * | 2/1999 | Ogden et al. | 40/411 |
| 6,001,013 A | * | 12/1999 | Ota | 463/7 |
| 6,034,315 A | * | 3/2000 | Takenaka et al. | 84/615 |
| 6,140,565 A | * | 10/2000 | Yamauchi et al. | 84/600 |
| 6,177,623 B1 | * | 1/2001 | Ooseki | 84/477 R |
| 6,253,246 B1 | * | 6/2001 | Nakatsuyama | 709/233 |
| 6,263,313 B1 | * | 7/2001 | Milsted et al. | 705/1 |
| 6,345,256 B1 | * | 2/2002 | Milsted et al. | 705/1 |
| 6,389,403 B1 | * | 5/2002 | Dorak, Jr. | 705/52 |
| 6,389,538 B1 | * | 5/2002 | Gruse et al. | 713/194 |
| 6,398,245 B1 | * | 6/2002 | Gruse et al. | 280/228 |
| 6,418,421 B1 | * | 7/2002 | Hurtado et al. | 705/54 |
| 6,573,444 B1 | * | 6/2003 | Yamamoto et al. | 84/604 |
| 6,574,609 B1 | * | 6/2003 | Downs et al. | 705/50 |
| 6,587,837 B1 | * | 7/2003 | Spagna et al. | 705/26 |
| 6,611,812 B2 | * | 8/2003 | Hurtado et al. | 705/26 |
| 6,717,042 B2 | * | 4/2004 | Loo et al. | 84/464 R |
| 6,822,154 B1 | * | 11/2004 | Thai | 84/609 |
| 6,834,110 B1 | * | 12/2004 | Marconcini et al. | 380/239 |
| 6,859,791 B1 | * | 2/2005 | Spagna et al. | 705/51 |
| 6,959,288 B1 | * | 10/2005 | Medina et al. | 705/51 |
| 6,983,371 B1 | * | 1/2006 | Hurtado et al. | 713/189 |
| 7,110,984 B1 | * | 9/2006 | Spagna et al. | 705/57 |
| 7,188,085 B2 | * | 3/2007 | Pelletier | 705/50 |

(Continued)

*Primary Examiner*—Lincoln Donovan
*Assistant Examiner*—Christina Russell
(74) *Attorney, Agent, or Firm*—John L. Rogitz

(57) ABSTRACT

Both the beat and genre of music are used to select or generate a dance robot object for display of a robot icon on a computer monitor or for establishing the movements of a three-dimensional robot. The detected genre can define the type of dance performed by the robot. Also, the detected genre can be used to sort music. The genre can be detected using a neural network or by correlating the compressibility of the music to a genre.

10 Claims, 4 Drawing Sheets logic for detecting beat/genre

U.S. PATENT DOCUMENTS

| | | | |
|---|---|---|---|
| 7,206,748 B1 * | 4/2007 | Gruse et al. | 705/1 |
| 7,213,005 B2 * | 5/2007 | Mourad et al. | 705/64 |
| 7,228,437 B2 * | 6/2007 | Spagna et al. | 713/193 |
| 2002/0002468 A1 * | 1/2002 | Spagna et al. | 705/1 |
| 2002/0009289 A1 * | 1/2002 | Morishita et al. | 386/83 |
| 2002/0107803 A1 * | 8/2002 | Lisanke et al. | 705/51 |
| 2003/0040904 A1 * | 2/2003 | Whitman et al. | 704/212 |
| 2003/0069669 A1 * | 4/2003 | Yamaura | 700/245 |
| 2003/0105718 A1 * | 6/2003 | Hurtado et al. | 705/51 |
| 2003/0110130 A1 * | 6/2003 | Pelletier | 705/50 |
| 2003/0135464 A1 * | 7/2003 | Mourad et al. | 705/50 |
| 2004/0037183 A1 * | 2/2004 | Tanaka et al. | 369/47.16 |
| 2004/0193322 A1 * | 9/2004 | Pirjanian et al. | 700/259 |
| 2004/0231498 A1 * | 11/2004 | Li et al. | 84/634 |
| 2006/0065102 A1 * | 3/2006 | Xu | 84/600 |

* cited by examiner system logic for detecting beat/genre logic for constructing robot

SYSTEM AND METHOD FOR DETERMINING GENRE OF AUDIO

I. FIELD OF THE INVENTION

The present invention relates generally to music genre detection systems.

II. BACKGROUND OF THE INVENTION

Entertainment robots have been provided that essentially are figurines that can be three dimensional or that can be icons displayed on a computer monitor. In either case, the software governing robot movement is the same. The robots can move in keeping with the beat of a piece of music or other audio that is accessed by the computer. As recognized herein, however, while the robot moves with the beat, the particular dance poses adopted by the robot are independent of the particular genre of music being played, thus resulting in inappropriate motions for some music. For example, a robot that exhibits motions appropriate for rap music can slow down the motions for a slower, classical music beat but cannot change the motion patterns to reflect a classical music dance form. Having made this recognition and the broader recognition that it would be advantageous to detect music genre not just for altering the dance style of an entertainment robot but also to perform other useful functions such as automatically sorting a user's music by genre, the invention set forth herein is provided.

SUMMARY OF THE INVENTION

A computer-implemented method for detecting and using music genre includes receiving an audio file representing music. The method also includes determining a genre of the music for output thereof. The genre can be determined using one or both of a neural network, and a determination of the compressibility of the music, which compressibility can be correlated to a music genre. Based on the genre the motion of a robot can be established, and/or the music can be stored in a genre-sorted data storage. As used herein, a "genre" of music is independent of the particular beat of the music.

When compressibility is used, if the music is relatively incompressible, the detected genre is indicated as being rock music, and if the music is relatively compressible, the detected genre is indicated as being classical music. The compressibility may be determined using a lossless compression algorithm.

In another aspect, a computer system includes a processor that receives data which represents music. The processor determines a genre of the music. Based thereon, the processor establishes motions of a dance robot associated with the processor.

In yet another aspect, a computer system includes a processor that receives data which represents music. The processor determines a genre of the music and based thereon stores the music in a genre-sorted data storage.

In still another aspect, a computer system includes a processor that receives data which represents music. Means are available to the processor for determining a compressibility of the music. Also, means are available to the processor for correlating the compressibility to a genre.

In another aspect, a computer system includes a processor that receives data which represents music. Means are available to the processor for processing the music using a neural network to determine a genre of the music.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

In the preferred non-limiting embodiment shown, the processors described herein may access one or more software or hardware elements to undertake the present logic. The flow charts herein illustrate the structure of the logic modules of the present invention as embodied in computer program software, in logic flow chart format, it being understood that the logic could also be represented using a state diagram or other convention. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/servers as a series of computer-executable instructions. In addition to residing on hard disk drives, these instructions may reside, for example, in RAM of the appropriate computer, or the instructions may be stored on magnetic tape, electronic read-only memory, or other appropriate data storage device.

Figure 1:
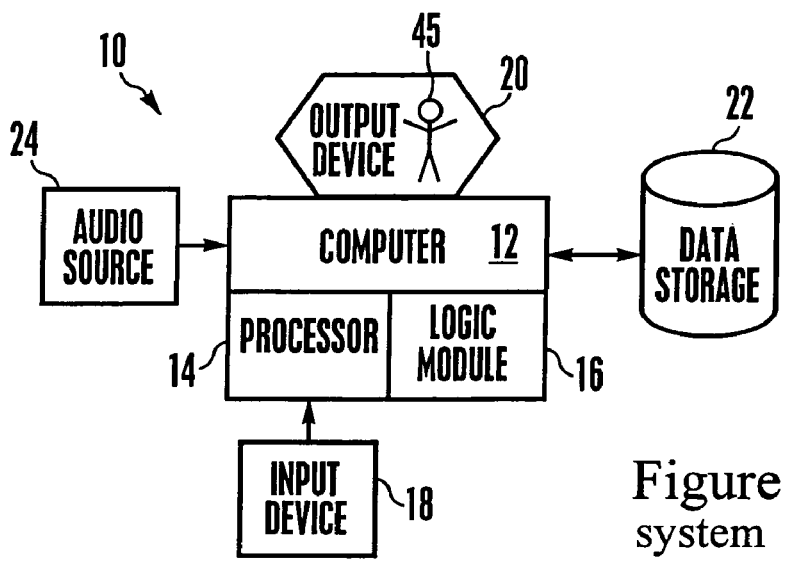
FIG. 1 is a block diagram of the present invention.

Referring initially to FIG. 1, a system is shown, generally designated 10, which includes any appropriate computer 12 such as, for instance, a Sony VAIO® computer, having a processor 14 and a logic module 16 that stores software executable by the processor 14 in accordance with present principles. The logic module 16 can be any suitable data storage device. The processor 14 may receive manual or audible data entry from one or more input devices 18, such as keyboards, mice, voice recognition devices, etc. and may output information on one or more output devices, such as the monitor 20 shown or onto printers, networks, other computers, etc. In addition to the logic module 16, the processor 14 may also access a data storage 22 such as a hard disk drive, optical disk drive, and the like.

As set forth further below, the processor 14 executes logic in the logic module 16 to process digital audio files and particularly music files for determining music genre in accordance with present principles. The files may come from a source 24 of audio, the details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Figure 2:
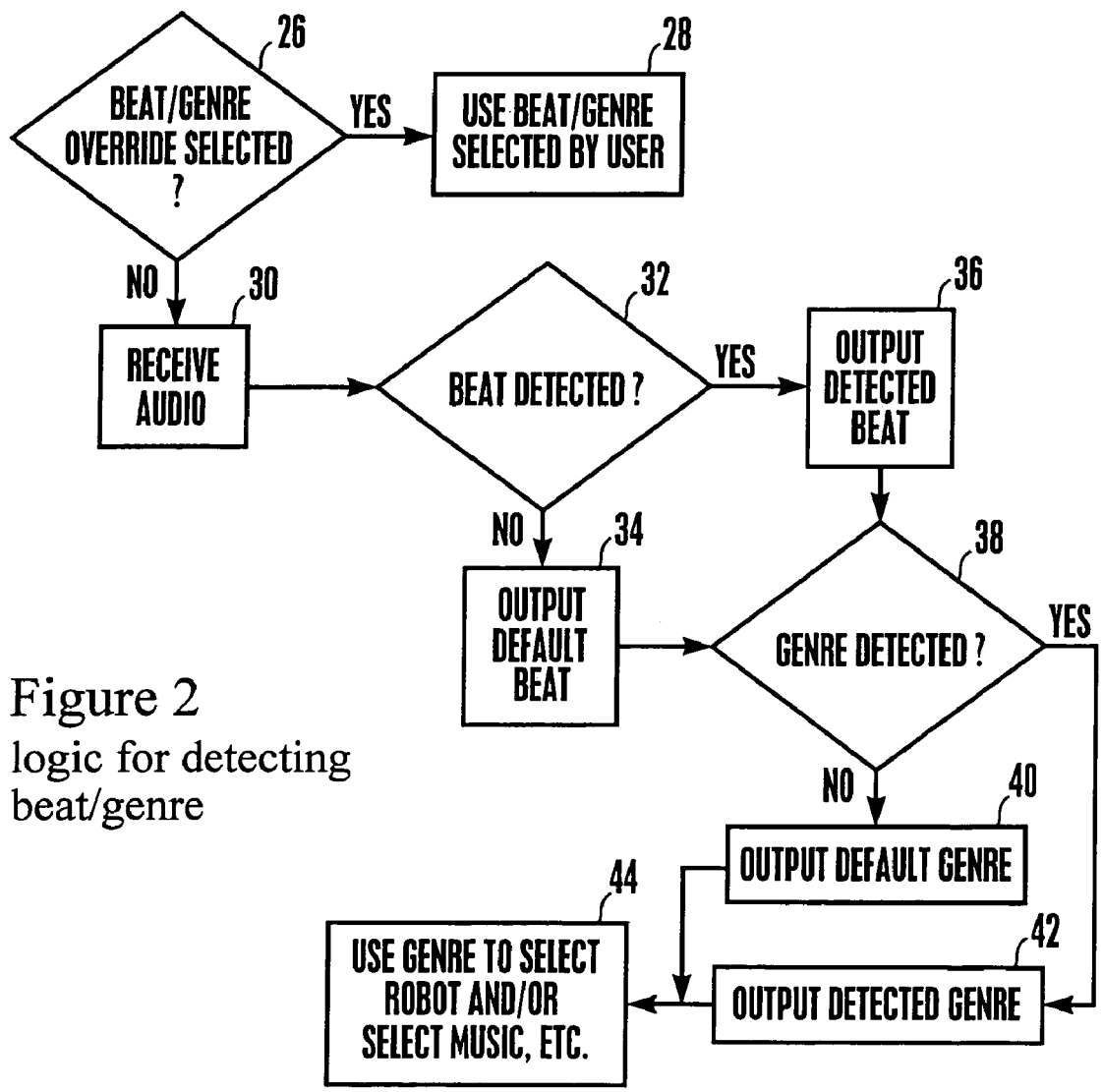
FIG. 2 is a flow chart of the logic for detecting beat and genre of a music piece.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music details of which are not limiting. The audio files may come from the source already digitized or the music may be in analog format and be processed by a digitizer in accordance with principles known in the art, for further processing by the processor 14. In one exemplary non-limiting embodiment, the source 24 may be a DVD player.

Now referring to FIG. 2 for an exemplary non-limiting illustration of the present logic, commencing at decision diamond 26 it is determined whether the user has indicated overriding one or both of beat and genre automatic determination. If such is the case, the logic ends for the overridden parameter, or it may proceed to block .28 to access a user-defined beat and genre.

When the user has not indicated a desire to override automatic beat/genre determination, the logic moves to block 30 to receive an audio file and then to decision diamond 32 to determine whether a beat has been detected in the music. Beat detection techniques are well known in the art. If a beat has not been detected, a default beat is output at block 34; otherwise, the detected beat is output at block 36.

After beat detection it is determined at decision diamond 38 whether a genre has been or can be determined for the music, it being understood that the order of beat and genre determination is not critical. In accordance with the present invention, music genre may be determined by processing the music with a neural network that has been trained by the user with example pieces of music. Neural networks and the training therefor are known in the art, e.g., U.S. Pat. No. 5,619,616, incorporated herein by reference, sets forth one non-limiting exemplary neural network that may be used.

Alternatively, as recognized by the present invention the amount by which a music file may be compressed can be correlated to a genre of music. The compression algorithm used for the compression test may be a lossless algorithm such as but not limited to the Free Lossless Audio Codec (FLAG) compression algorithm. In any case, the present invention has critically observed that if the music is relatively incompressible, e.g., can be compressed by only around thirty percent or less, the detected genre can be indicated as being rock music, and if the music is relatively compressible, e.g., can be compressed by eighty percent or so, the detected genre may be indicated as being classical music. That is, the amount by which a piece of music is compressible can be correlated to its genre. Compression amounts corresponding to other music genres can be similarly determined empirically.

If no genre is detected, a default genre can be output at block 40. Otherwise, the detected genre can be output at block 42. Then, at block 44 the genre is used for, e.g., selecting a particular dance robot routine as set forth further below in reference to FIG. 3, or to sort the music, i.e., to store the music in a sorted list by genre, so that all classical music, is stored together on a disk that might be burned, or all rock music is stored together, etc. Or, if the user has indicated a desire to hear a particular genre of music and the piece under test is in that genre, it can be played for the user at block 44.

Figure 3:
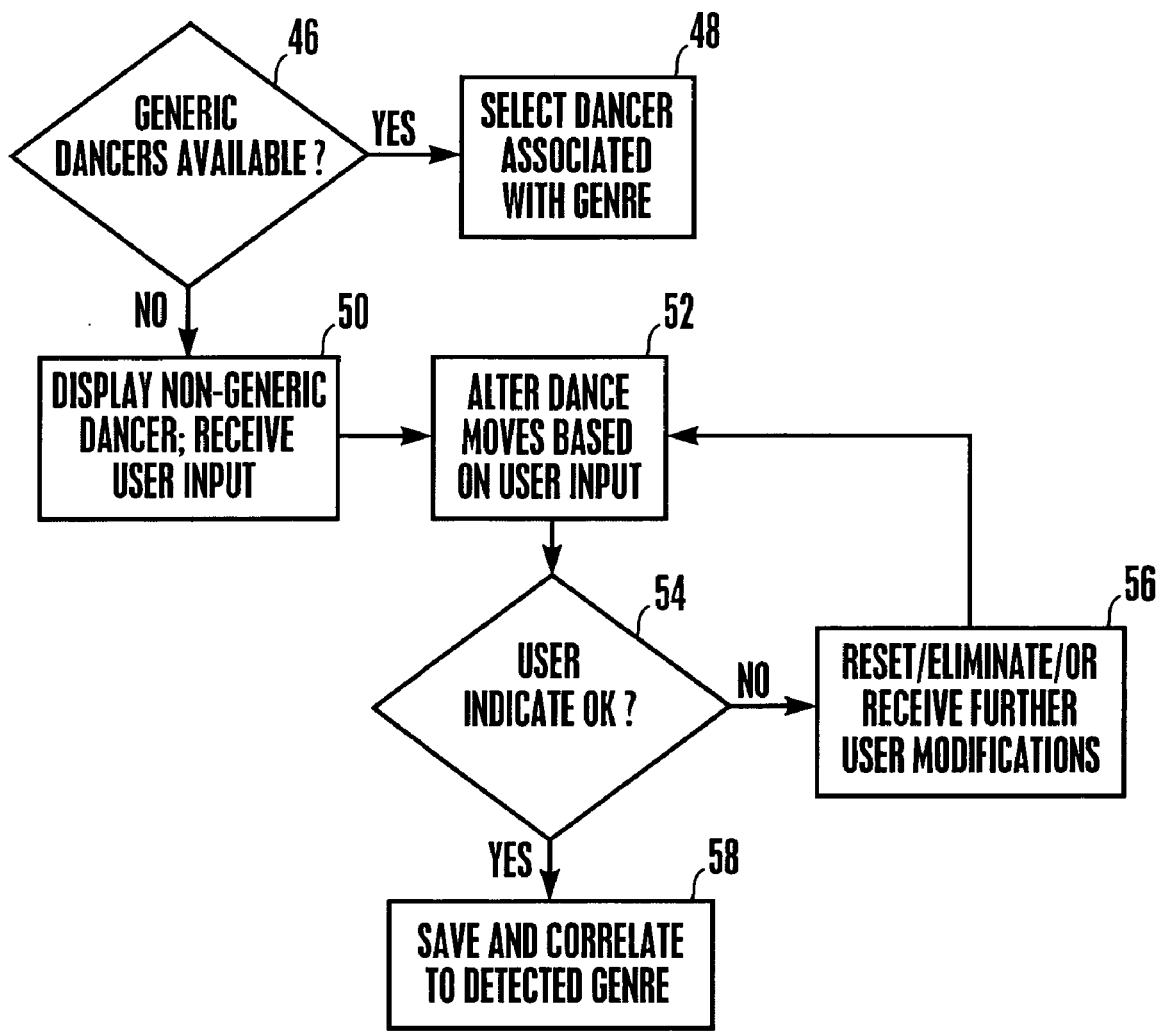
FIG. 3 is a flow chart of the logic for constructing a dance robot using genre.
Figure 5:
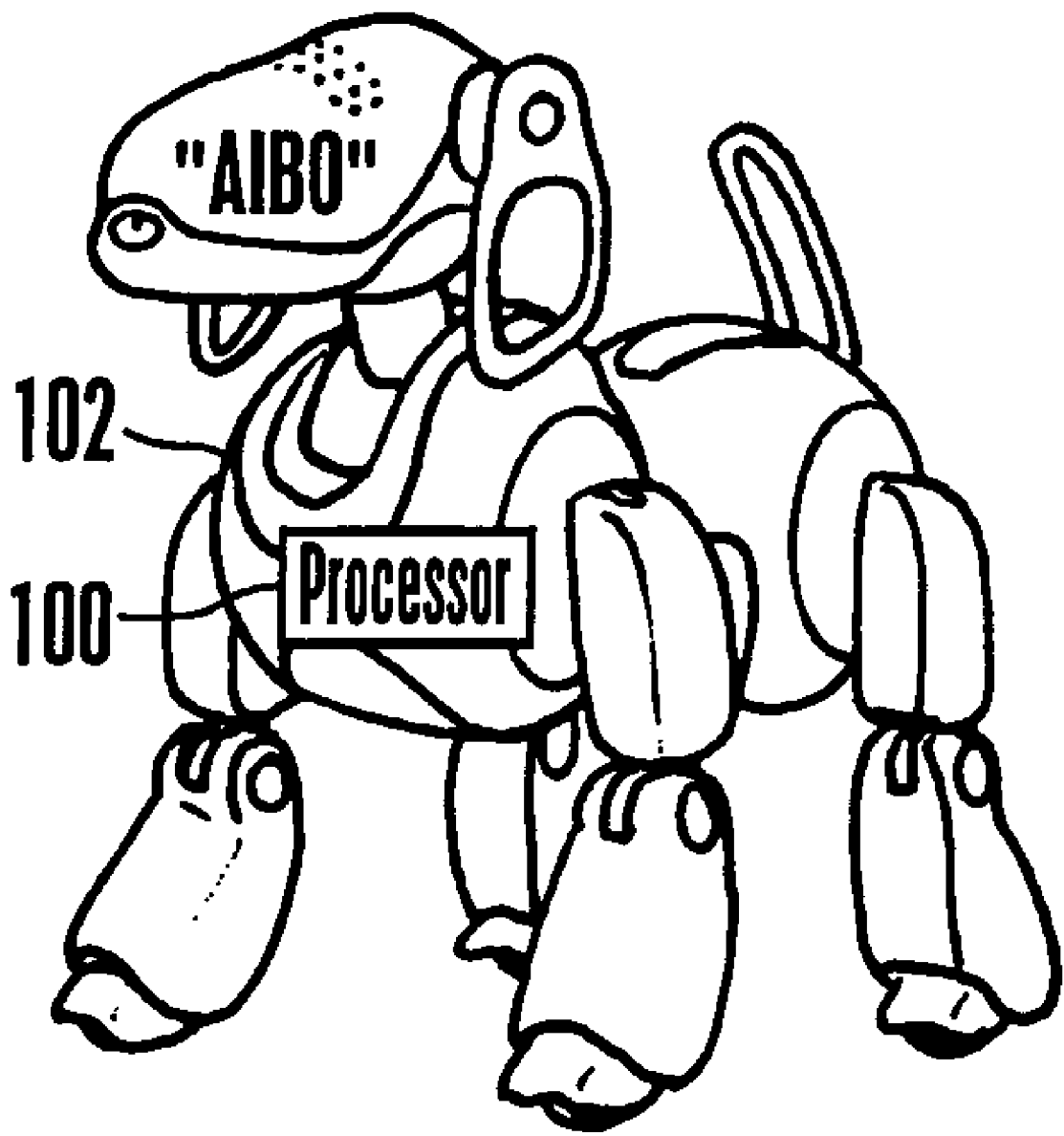
FIG. 5 is a schematic representation of a three-dimensional robot programmed to move in accordance with music genre detection.

The logic of FIG. 3 can be invoked to select or construct a moving video dancer 45 (FIG. 1) for display of the dancer on the monitor 20. The same logic can be implemented in a processor 100 of a three-dimensional metal or plastic robot 102 (FIG. 5) to cause the robot to move in accordance with the genre of the music.

Commencing at decision diamond 46, if a set of generic dancers is available, e.g., a classical dancer instance of a dancer object, a rap dancer instance of a dancer object, and a country-western dancer instance of a dancer object, the logic simply selects, at block 48, the instance matching the determined genre for display. Note that all dance robots may move to the detected beat, and what separates one dance robot from another is the pattern of dance motions exhibited by the robot, which patterns are established as set forth herein to be appropriate for the particular musical genre with which the particular dance robot is associated.

If no set of dancer instances are available, the logic can flow from decision diamond 46 to block 50 to display a non-generic instance of a dancer object. The user can then input various desired dance movements for the displayed figure. Or, the processor can present sample dance movements so that the dance moves of the figure are altered from a default dance move at block 52. The logic can then proceed to decision diamond 54 to receive an input from the user indicating whether the displayed dance moves meet with the user's approval, or whether the user wishes further modifications. If the user indicates dissatisfaction the logic can move to block 56 to allow the user to reset the dance movements to default, or to eliminate genre processing altogether, or to receive further user instruction as to desired movements. The logic at block 56 may be performed without user interaction. If the user indicates satisfaction with the particular movements, however, the logic moves to block 58 to save the instance of the dancer object and correlate it to the associate music genre. In the same way, the robot 102 in FIG. 5 can be programmed (using voice recognition input, or keyboard/keypad input) to move in accordance with music genre.

Figure 4:
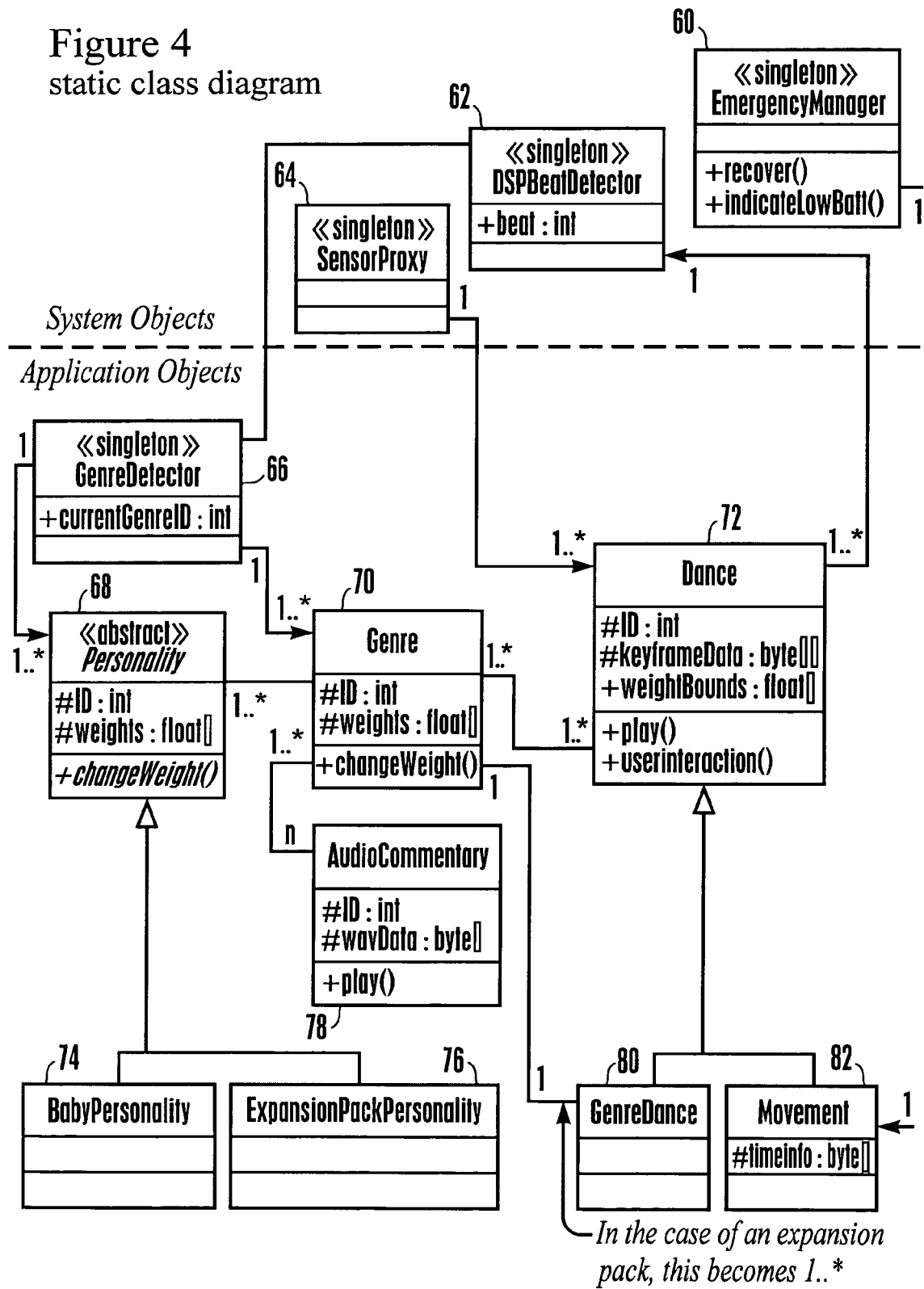
FIG. 4 is a static object class diagram.

FIG. 4 shows one non-limiting illustration of the above-described invention implemented using object oriented programming. At the system level, a single instance of an emergency manager object 60 may be provided for recovering from faults, warning of low computer battery voltage, and other emergency actions. Also, a single instance of a beat detector object 62 can be provided that includes an integer representing the detected beat of the music. And, a single instance of a sensor proxy object 64 can be provided that represents the source 24 of audio shown in FIG. 1.

At the application level, a single instance of a genre detector object 66 can be provided that represents the identification of the current genre being processed. As shown, the genre detector object 66 is logically connected to the beat detector object 62, and to one or more instances of a personality object 68 and genre object 70. The personality object 68 represents dance personalities as might be reflected in particular dance movements of the generic dance robots discussed above, and can include an identifier and weighting factors useful for defining dance movement patterns. An instance of the genre object 70 also includes an identifier and weighting factors useful for defining dance movements, with the weighting factors being changeable in accordance with principles set forth above.

The personality and genre objects 68, 70 are logically connected together as shown, and the genre object 70 furthermore is logically connected to one or more instances of a dance object 72, which is the object used to display the dance robots set forth above. An instance of a dance object 72 can include an identifier, keyframe data, and weight bounds that are used to define dance motions, and can be played and can further accept user input in accordance with logic discussed above.

FIG. 4 shows that a baby personality object 74, essentially a genericless dance robot object, can feed information to the personality object 68 instances, as can an expansion pack personality object 76, which contains the predetermined generic dance robots discussed above in relation to block 48 of FIG. 3. If desired, instances of an audio commentary object 78 may feed information to the genre object 70 instances as shown. An audio commentary object 78 may include an identifier and a music file in, e.g., .wav format, and can be played when an associated dance robot is displayed or when a three-dimensional robot moves. A single instance of a genre dance object 80 and one or more instances of a movement object 82 feed information to the dance object 72 and logically connect to the genre object 70. The software objects discussed above may be accessed by the processor 100 of the robot 102 in FIG. 5 to cause the robot 102 to move accordingly.

While the particular SYSTEM AND METHOD FOR DETERMINING GENRE OF AUDIO as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A computer-implemented method for detecting and using music genre, comprising:
   receiving at a three dimensional movable dance robot an analog version of an audio signal representing music;
   digitizing the signal;
   determining a genre of the music for output thereof based on determining a compressibility of the music, the compressibility being correlatable to a music genre;
   based on the genre, establishing movements of the dance robot.

2. The method of claim 1, wherein if the music is relatively incompressible, the detected genre is indicated as being rock music, and if the music is relatively compressible, the detected genre is indicated as being classical music.

3. The method of claim 2, wherein the compressibility is determined using a lossless compression algorithm.

4. The method of claim 1, comprising selecting one of plural dance robot objects based on the genre.

5. The method of claim 1, comprising storing the music based on the genre.

6. A computer system, comprising:
   at least one processor in a three dimensional dance robot aurally receiving music which is digitized and sent to the processor;
   the processor executing logic for determining a genre of the music by determining how compressible the music is and correlating how compressible the music is to a genre, and based thereon establishing movement of the robot.

7. The system of claim 6, wherein the logic further includes storing the music in a genre-sorted data storage.

8. The system of claim 6, wherein if the music is relatively incompressible, the detected genre is indicated as being rock music, and if the music is relatively compressible, the detected genre is indicated as being classical music.

9. A computer system, comprising:
   a three dimensional dance robot;
   at least one processor in the dance robot aurally receiving aural music, the robot digitizing the aurally received music and providing the digitized music to the processor;
   means available to the processor for determining at least a beat of music and how much the music can be compressed;
   means available to the processor for determining a genre of the music based on the amount the music can be compressed; and
   means for establishing a dance motion of the robot based at least in part on the beat and genre.

10. The system of claim 9, comprising means available to the processor for storing the music in a genre-sorted data storage.

* * * * *